US012761370B2

(12) United States Patent
Sheikh et al.

(10) Patent No.: US 12,761,370 B2
(45) Date of Patent: Oct. 13, 2026

(54) GLOBAL NAVIGATIONAL SATELLITE SYSTEM (GNSS) INTERFERENCE DETECTION

(71) Applicant: Cisco Technology, Inc., San Jose, CA (US)

(72) Inventors: Ashish Sheikh, Akron, OH (US); Ardalan Alizadeh, Milpitas, CA (US); Peiman Amini, Fremont, CA (US); Niloo Bahadori, Greensboro, NC (US); Matthew Aaron Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 320 days.

(21) Appl. No.: 18/301,449

(22) Filed: Apr. 17, 2023

(65) Prior Publication Data

US 2024/0345259 A1 Oct. 17, 2024

(51) Int. Cl.
*G01S 19/21* (2010.01)

(52) U.S. Cl.
CPC .................................. *G01S 19/215* (2013.01)

(58) Field of Classification Search
CPC ..................................................... G01S 19/215
See application file for complete search history.

(56) References Cited

U.S. PATENT DOCUMENTS

| | | | | |
|---|---|---|---|---|
| 7,912,643 | B1 * | 3/2011 | Bean | G01S 19/215 342/357.29 |
| 9,185,516 | B2 * | 11/2015 | Fischer | H04W 4/02 |
| 10,466,700 | B1 * | 11/2019 | Carmack | G05D 1/101 |
| 11,656,362 | B2 * | 5/2023 | Lavi | G01S 19/215 342/357.59 |
| 11,860,283 | B2 * | 1/2024 | Schwindt | G01S 19/215 |
| 2014/0247185 | A1 * | 9/2014 | Achanta | G01S 19/21 342/357.58 |
| 2016/0154113 | A1 | 6/2016 | Leibner et al. | |
| 2017/0369183 | A1 * | 12/2017 | Tarimala | G01S 13/878 |
| 2022/0050213 | A1 | 2/2022 | De Wilde et al. | |
| 2022/0099842 | A1 | 3/2022 | Cao et al. | |
| 2022/0397682 | A1 | 12/2022 | Saunders et al. | |

FOREIGN PATENT DOCUMENTS

WO 2020240571 A1 12/2020

* cited by examiner

*Primary Examiner* — Cassi J Galt
(74) *Attorney, Agent, or Firm* — Merchant & Gould P.C.

(57) ABSTRACT

Global Navigation Satellite System (GNSS) interference detection may be provided. A satellite tracking table for a first Access Point (AP) may be created. The satellite tracking table may include a listing of a plurality of satellites of a Global Navigation Satellite System (GNSS) available for the first AP and expected satellite parameters for each of the plurality of satellites. A derived satellite parameter may be determined from a received GNSS signal. The derived satellite parameter may be compared with an corresponding expected satellite parameter. The corresponding expected satellite parameter may be determined from the satellite tracking table. An interference event may be determined when the derived satellite parameter differs from the corresponding expected satellite parameter by at least a predetermined amount.

20 Claims, 3 Drawing Sheets

GLOBAL NAVIGATIONAL SATELLITE SYSTEM (GNSS) INTERFERENCE DETECTION

TECHNICAL FIELD

The present disclosure relates generally to Global Navigational Satellite System (GNSS) interference detection.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
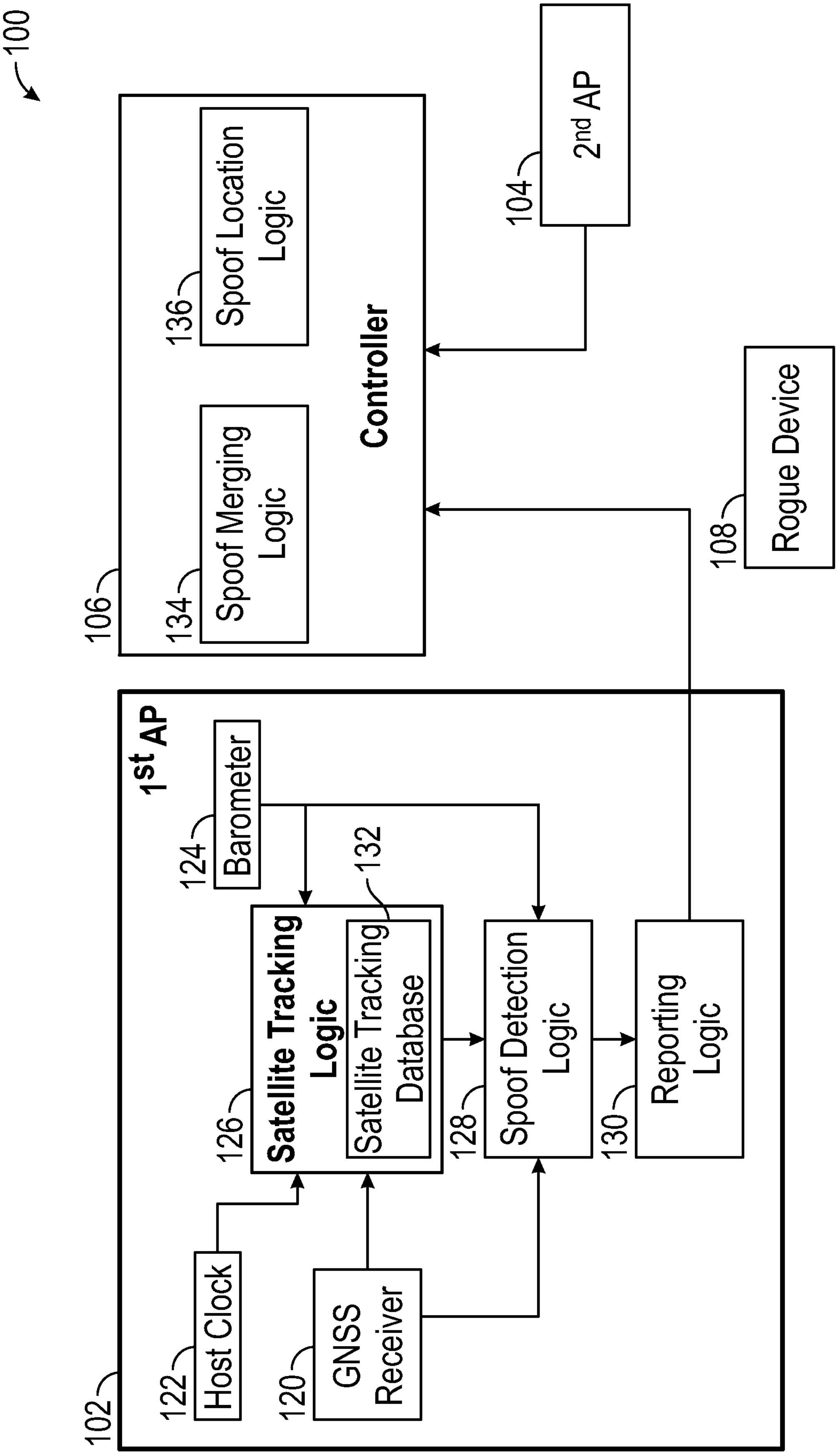
FIG. 1 is a block diagram of an operating environment.

Global Navigation Satellite System (GNSS) interference detection may be provided. A satellite tracking table for a first Access Point (AP) may be created. The satellite tracking table may include a listing of a plurality of satellites of a Global Navigation Satellite System (GNSS) available for the first AP and expected satellite parameters for each of the plurality of satellites. A derived satellite parameter may be determined from a received GNSS signal. The derived satellite parameter may be compared with an corresponding expected satellite parameter. The corresponding expected satellite parameter may be determined from the satellite tracking table. An interference event may be determined when the derived satellite parameter differs from the corresponding expected satellite parameter by at least a predetermined amount.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A Global Navigation Satellite System (GNSS) (e.g., a Global Positioning System (GPS)) may be a satellite constellation that may provide positioning, navigation, and timing services. A GNSS receiver may receive different time-stamped signals from the satellite constellation and may determine latitude and longitude coordinates of the GNSS receiver. However, the determination may be vulnerable to interferences, such as, spoofing or jamming attacks. A spoofing attack may be used to masquerade or falsify the GNSS signal data. A jamming attack may be used to degrade or completely block the GNSS signal.

A spoofing attack, for example, may involve an attempt by an attacker to trick a GNSS receiver by broadcasting a spoof signal that is different from GNSS signals that are broadcasted from GNSS satellites. The spoofed signal may be designed to appear as a normal or standard GNSS signal. However, the spoofed signal may be modified in such a manner to cause the GNSS receiver to produce a position at a location determined by the attacker, as opposed to the GNSS receiver's actual location. Thus, a goal of the spoofing in this example, may be to provide the GNSS receiver with a misleading signal and therefore deceive the GNSS receiver by using inaccurate, false signals when making positioning calculations. The disclosure may provide processes to detect such GNSS interferences.

FIG. 1 shows an operating environment 100 consistent with embodiments of the disclosure for GNSS interference detection. As shown in FIG. 1, operating environment 100 may comprise a first Access Point (AP) 102, a second AP 104, a controller 106, and a rogue device 108. Second AP 104 may be in a neighborhood of first AP 102. Each first AP 102 and second AP 104 may be compatible with specification standards such as, but not limited to, the Institute of Electrical and Electronics Engineers (IEEE) 802.11 specification standard for example. First AP 102 and second AP 104 may be anchor APs and may communicate with each other to conduct operations in concert. An anchor AP may comprise an AP having a direct line of site to GNSS satellites may generally be located at an edge of a building. Operating environment 100, in some examples, may comprise more than two APs.

Controller 106 may comprise a Wireless Local Area Network (LAN) Controller (WLC) and may provision and control operating environment 100. Controller 106 may be implemented by a Digital Network Architecture Center (DNAC) controller (i.e., a Software-Defined Network (SDN) controller). Rogue device 108 may comprise a device capable of recording and broadcasting spoofed GNSS signals. Operating environment 100 may comprise more than one rogue device.

First AP 102, second AP 104, and controller 106 may provide a Wireless Local Area Network (WLAN). Through this WLAN, one or more user devices may be provided with access to a wireless network that may be operated by an institution or an enterprise. Access to the WLAN may provide a user device with access to the Internet or other cloud-based networking environments.

First AP 102 may include a GNSS receiver 120 (e.g., a GNSS radio), a host clock 122, a barometer 124, a satellite tracking logic 126, a spoof detection logic 128, and a reporting logic 130. Satellite tracking logic 126 may include a satellite tracking database 132. Although not shown in FIG. 1, other APs of operating environment (e.g., second AP 104) may also include GNSS receiver 120, host clock 122, barometer 124, satellite tracking logic 126, spoof detection logic 128, and reporting logic 130.

In accordance with some embodiments, satellite tracking logic 126, spoof detection logic 128, and reporting logic 130 may be located on controller 106 instead of first AP 102 and second AP 104. This may result in lower processing requirement at first AP 102 and second AP 104. Controller 106 may include a spoof merging logic 134 and a spoof location logic 136.

The elements of operating environment 100 (e.g., first AP 102, second AP 104, controller 106, rogue device 108, GNSS receiver 120, host clock 122, barometer 124, satellite tracking logic 126, spoof detection logic 128, reporting logic 130, satellite tracking database 132, spoof merging logic 134, and spoof location logic 136) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of an operating environment may be practiced in a computing device 300.

Figure 2:
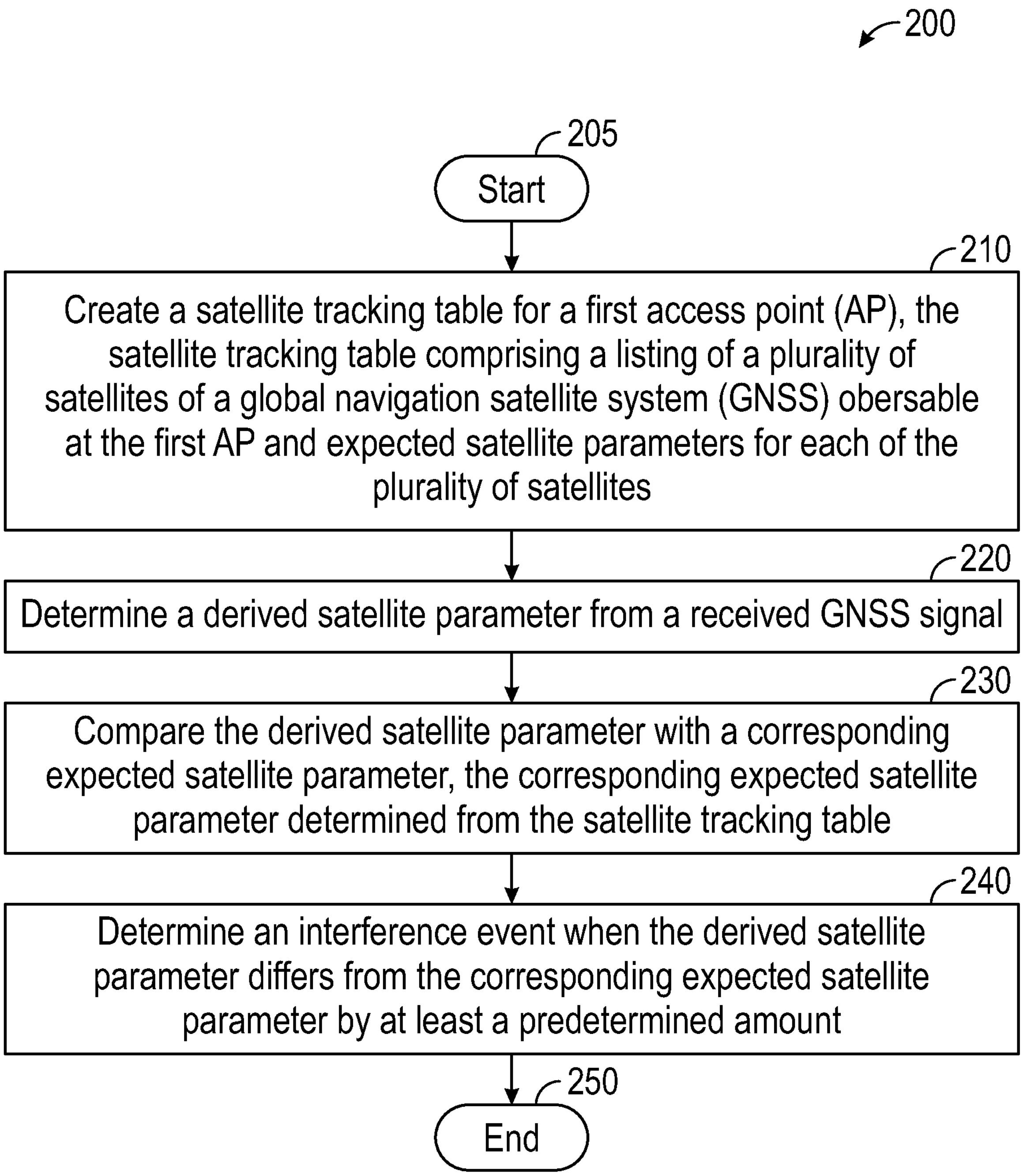
FIG. 2 is a flow chart of a method for detecting GNSS interference.

FIG. 2 is a flow chart setting forth the general stages involved in a method 200 consistent with an embodiment of the disclosure for detecting GNSS interference. Method 200 may be performed by first AP 102, second AP, or controller 106. Ways to implement the stages of method 200 may be described in greater detail below.

Method 200 may begin at starting block 205 and proceed to stage 210 where a satellite tracking table for first AP 102 may be created. The satellite tracking table may comprise a listing of a plurality of satellites of a GNSS observable for first AP 102 and expected satellite parameters for each of the plurality of satellites. The satellite tracking table may be created for each AP (i.e., first AP 102 and second AP 104) of operating environment 100.

The satellite tracking table may be created during a tracking phase. The tracking phase may initiate when first AP 102 boots up or may be triggered by an administrator. The tracking phase may last for a predetermined time (e.g., 24 hours). During the tracking phase, GNSS receiver 120 may monitor a satellite identifier of each satellite of a GNSS observable to or seen by GNSS receiver 120. In addition, GNSS receiver 120 may monitor a time window seen when each satellite of the GNSS is observable by GNSS receiver 120 and a time window of active use when each satellite of the GNSS is used for position, time, or navigation services.

Satellite tracking logic 126 may receive the satellite Identifier (ID), the time window seen, and the time window of active use for each satellite observable to GNSS receiver 120. Satellite tracking logic 126 may further receive clock information from host clock 122 and pressure information from barometer 124. The pressure information from barometer 124 may be converted to an altitude and stored. Satellite tracking logic 126 may further receive National Marine Electronics Associate (NMEA) sentences, decoded Position, Velocity, and Time (PVT) information, and any corresponding corrections from Real Time Kinematic/Differential Global Positioning System/Satellite-Based Augmentation System (RTK/DGPS/SBAS).

Based on the received information, satellite tracking logic 126 may create the satellite tracking table. The satellite tracking table may comprise one or more of a satellite ID, a constellation type, a time window seen, and a time window of active use for each observable satellite of the GNSS. In addition, the satellite tracking table may further comprise one or more of: a signal-to-noise ratio, a carrier-to-noise ratio, a satellite pseudorange, a rate of change of the satellite pseudorange, a rate of change of the signal-to-noise ratio, a rate of change of the carrier-to-noise ratio, a signal power, and an in-band power density for each observable satellite of a GNSS. The satellite tracking table may be stored in satellite tracking database 132.

During the satellite tracking table creation, first AP 102 may check a current position estimate with a previous position estimate to see if first AP 102 may have moved. Threshold values may be set using Dilution of Precision (DOP) values obtained from the NMEA sentences. The satellite tracking table may therefore store a "fingerprint" for first AP's 102 GNSS radio 120 based on the NMEA messages. Each AP of operating environment 100 may have a unique fingerprint and these satellite patterns may be stored for all APs. For any given country, a fixed GNSS receiver 120 may be seeing the same satellite from a GPS constellation every 23 h 56 min 4 s which may be defined as a sidereal day. For example, a fixed GNSS receiver 120 in Richfield, OH may be seeing GPS Sat ID: 4 at around the same time every day (with about 4 min difference). The satellite tracking table may be updated at a predetermined interval. For example, the satellite tracking table may be upgraded ever week or every month.

From stage 210, where the satellite tracking table is created, method 200 may advance to stage 220 where a derived satellite parameter may be determined from a received GNSS signal. GNSS receiver 120 or spoof detection logic 128 may determine a derived satellite parameter for a GNSS signal received at GNSS receiver 120. GNSS receiver 120, for example, may receive a GNSS signal and decode the received GNSS signal to determine a derived satellite parameter. The derived satellite parameter may comprises one or more of the following: a satellite ID, a constellation type, a time stamp, a distance to a source of the received GNSS signal, a signal-to-noise ratio of the received GNSS signal, a carrier-to-noise ratio of the received GNSS signal, a satellite pseudorange of the received GNSS signal, a rate of change of the satellite pseudorange, a rate of change of the signal-to-noise ratio, a rate of change of the carrier-to-noise ratio, a signal power of the received GNSS signal, and an in-band power density of the received GNSS signal.

Once the derived satellite parameter is determined in stage 220, method 200 may continue to stage 230 where spoof detection logic 128 may compare the derived satellite parameter with a corresponding expected satellite parameter. The corresponding expected satellite parameter may be determined from the satellite tracking table. For example, after receiving the derived satellite parameter, spoof detection logic 128 may determine a satellite ID associated with the received GNSS signal. Spoof detection logic 128 then may perform a lookup operation in the satellite tracking table based on the determined satellite ID to determine the corresponding expected satellite parameter. The corresponding expected satellite parameter may include one of the following: a time window seen and a time window of active use. The corresponding expected satellite parameter may further comprise one or more of the following: a distance, a signal-to-noise ratio, a carrier-to-noise ratio, a satellite pseudorange, a rate of change of the satellite pseudorange, a rate of change of the signal-to-noise ratio, a rate of change of the carrier-to-noise ratio, a signal power, and an in-band power density. Spoof detection logic 128 may compare the derived satellite parameter with the corresponding expected satellite parameter. In some example embodiments, spoof detection logic 128 may compare more than one derived satellite parameter with its corresponding expected satellite parameter.

After spoof detection logic 128 compares the derived satellite parameter with the corresponding expected satellite parameter in stage 230, method 200 may proceed to stage 240 where spoof detection logic 128 may determine an interference event. The interference event is determined when the derived satellite parameter differs from the corresponding expected satellite parameter by at least a predetermined amount (e.g., a threshold value). The predetermined amount may be defined by an administrator. For example, spoof detection logic 128 may determine that a time stamp associated with the received GNSS signal is outside of an expected time window seen or an expected time window of active use for a GNSS satellite matching a satellite ID in the received GNSS signal. In another example, spoof detection logic 128 may determine that a range of a GNSS satellite matching a satellite ID in the received GNSS signal is different than an expected range for a GNSS satellite matching a satellite ID in the received GNSS signal.

In accordance with example embodiments, spoof detection logic 128 may compare another derived satellite parameter with its corresponding expected satellite parameter to confirm the interference event. For example, after determining the interference event based on a time stamp, spoof detection logic 128 may compare a carrier-to-noise ratio of the received GNSS signal with its corresponding expected value to confirm the interference event. In other example, spoof detection logic 128 may compare one or more of: a distance, a carrier-to-noise ratio, a satellite pseudorange, a rate of change of the satellite pseudorange, a rate of change of the signal-to-noise ratio, a rate of change of the carrier-to-noise ratio, a signal power, and an in-band power density of the received GNSS signal with its corresponding expected value to confirm the interference event. Once spoof detection logic 128 determines the interference event in stage 240, method 200 may then end at stage 250.

After determining the interference event, reporting logic 130 may report the interference event to spoof merging logic 134. Spoof merging logic 134 may merge or confirm the interference event determined at first AP 102 with a another interference event determined at second AP 104. If the no corresponding interference event is determined at second AP 104, then spoof merging logic 134 may determine the interference event determined at first AP 102 to be a false positive.

Spoof location logic 136 may determine a location of the interference source (e.g., of rogue device 108) that may be responsible for the interference event. For example, upon detection of the inference event, reporting logic 130 may send a Received Signal Strength Indicator (RSSI) associated with the spoofed GNSS signal to spoof location logic 136. Spoof location logic 136 may determine a location of the interference source from the RSSI. Methods for detecting the location may include Power Difference On Arrival (PDoA, also known as signal-to-noise ratio cross-correlation), time of arrival (also known as Time Difference Of Arrival, TDoA, or time of arrival shift), Angle Of Arrival (AoA, also known as line of bearing), or terrain/elevation masking. The determined location of rogue device 108 may be displayed.

Figure 3:
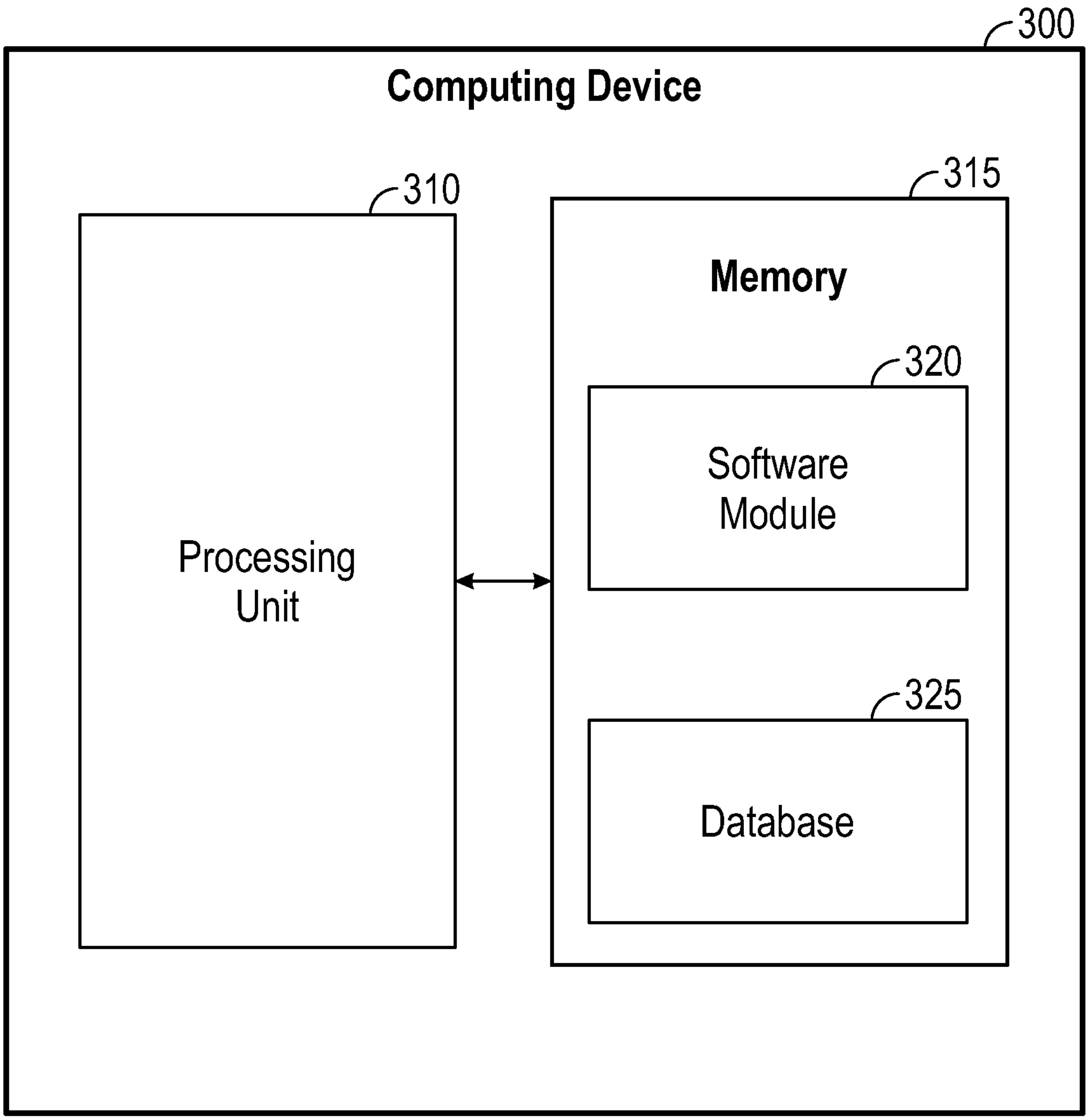
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for detecting GNSS interference, including for example, any one or more of the stages from method 200 described above with respect to FIG. 2. Computing device 300, for example, may provide an operating environment for first AP 102, second AP 104, controller 106, rogue device 108, GNSS receiver 120, host clock 122, barometer 124, satellite tracking logic 126, spoof detection logic 128, reporting logic 130, satellite tracking database 132, spoof merging logic 134, and spoof location logic 136. First AP 102, second AP 104, controller 106, rogue device 108, GNSS receiver 120, host clock 122, barometer 124, satellite tracking logic 126, spoof detection logic 128, reporting logic 130, satellite tracking database 132, spoof merging logic 134, and spoof location logic 136 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a System-on-a-Chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

creating a satellite tracking table for a first Access Point (AP), the satellite tracking table comprising a listing of a plurality of satellites of a Global Navigation Satellite System (GNSS) observable by the first AP, a corresponding satellite identifier, a corresponding time window seen, and one or more expected satellite parameters for each of the plurality of satellites;

determining, from a GNSS signal received at the first AP, a first derived satellite parameter comprising a time stamp associated with the received GNSS signal and a satellite identifier associated with the received GNSS signal;

comparing the first derived satellite parameter with a corresponding first expected satellite parameter determined from the satellite tracking table by using the satellite identifier associated with the received GNSS signal to identify, in the satellite tracking table, a matching satellite having a corresponding satellite identifier, wherein the corresponding first expected satellite parameter comprises a corresponding time window seen for the matching satellite, and wherein comparing comprises determining whether the time stamp associated with the received GNSS signal falls within the corresponding time window seen for the matching satellite;

determining an interference event in response to determining that the time stamp associated with the received GNSS signal falls outside of the corresponding time window seen for a GNSS satellite matching the satellite identifier in the received GNSS signal; and comparing, in response to determining the inference event, a second derived satellite parameter of the received GNSS signal with a corresponding second expected satellite parameter from the satellite tracking table for the matching satellite to confirm the interference event.

2. The method of claim 1, further comprising:

determining, in response to determining the interference event, a location of a source of the received GNSS signal.

3. The method of claim 2, further comprising:

displaying the determined location.

4. The method of claim 1, further comprising:
merging the interference event determined at the first AP with another interference event determined at a second AP, the second AP located in a neighborhood of the first AP.

5. The method of claim 1, wherein the corresponding first expected satellite parameter further comprises one or more of the following:
a constellation type;
and
a time window of active use.

6. The method of claim 1, wherein the corresponding second expected satellite parameter further comprises one or more of the following:
a signal-to-noise ratio associated with the received GNSS signal;
a carrier-to-noise ratio associated with the received GNSS signal;
a satellite pseudorange;
a rate of change of the satellite pseudorange;
a rate of change of the signal-to-noise ratio;
a rate of change of the carrier-to-noise ratio;
a power associated with the received GNSS signal; and
an in-band power density of the received GNSS signal.

7. The method of claim 1, wherein creating the satellite tracking table comprises creating the satellite tracking table at a Wireless Local Area Network (LAN) Controller (WLC).

8. A system comprising:
a memory storage; and
a processing unit coupled to the memory storage, wherein the processing unit is operative to:
create a satellite tracking table for a first Access Point (AP), the satellite tracking table comprising a listing of a plurality of satellites of a Global Navigation Satellite System (GNSS) observable by the first AP, a corresponding satellite identifier, a corresponding time window seen, and one or more expected satellite parameters for each of the plurality of satellites;
determine, from a GNSS signal received at the first AP, a first derived satellite parameter comprising a time stamp associated with the received GNSS signal and a satellite identifier associated with the received GNSS signal;
compare the first derived satellite parameter with a corresponding first expected satellite parameter determined from the satellite tracking table by using the satellite identifier associated with the received GNSS signal to identify, in the satellite tracking table, a matching satellite having a corresponding satellite identifier, wherein the corresponding first expected satellite parameter comprises a corresponding time window seen for the matching satellite, and wherein the processing unit being configured to compare the first derived satellite parameter with the corresponding first expected satellite parameter comprises the processing unit being configured to: determine whether the time stamp associated with the received GNSS signal falls within the corresponding time window seen; and
determine an interference event in response to determining that the time stamp associated with the received GNSS signal falls outside of the corresponding time window seen for a GNSS satellite matching the satellite identifier in the received GNSS signal; and
compare, in response to determining the inference event, a second derived satellite parameter of the received GNSS signal with a corresponding second expected satellite parameter from the satellite tracking table for the matching satellite to confirm the interference event.

9. The system of claim 8, wherein the processing unit is further configured to:
determine, in response to determining the interference event, a location of a source of the GNSS signal.

10. The system of claim 9, wherein the processing unit is further configured to:
display the determined location.

11. The system of claim 8, wherein the processing unit is further configured to:
merge the interference event determined at the first AP with another interference event determined at a second AP, the second AP being located in a neighborhood of the first AP.

12. The system of claim 8, wherein the satellite tracking table is created at a Wireless Local Area Network (LAN) Controller (WLC).

13. The system of claim 8, wherein the corresponding first expected satellite parameter further comprises one or more of the following:
a constellation type;
and
a time window of active use.

14. The system of claim 8, wherein the corresponding second expected satellite parameter further comprises one or more of the following:
a signal-to-noise ratio associated with the received GNSS signal;
a carrier-to-noise ratio associated with the received GNSS signal;
a satellite pseudorange;
a rate of change of the satellite pseudorange;
a rate of change of the signal-to-noise ratio;
a rate of change of the carrier-to-noise ratio;
a power associated with the received GNSS signal; and
an in-band power density of the received GNSS signal.

15. A non-transitory computer-readable medium that stores a set of instructions which when executed perform a method comprising:
creating a satellite tracking table for a first Access Point (AP), the satellite tracking table comprising a listing of a plurality of satellites of a Global Navigation Satellite System (GNSS) observable by the first AP, a corresponding satellite identifier, a corresponding time window seen, and one or more expected satellite parameters for each of the plurality of satellites;
determining, from a GNSS signal received at the first AP, a first derived satellite parameter comprising a time stamp associated with the received GNSS signal and a satellite identifier associated with the received GNSS signal received;
comparing the first derived satellite parameter with a corresponding first expected satellite parameter determined from the satellite tracking table by using the satellite identifier associated with the received GNSS signal to identify, in the satellite tracking table, a matching satellite having a corresponding satellite identifier, wherein the corresponding first expected satellite parameter comprises determining whether the time stamp associated with the received GNSS signal falls within the corresponding time window seen for the matching satellite;
determining an interference event in response to determining that the time stamp associated with the received GNSS signal falls outside of the corresponding time window seen for a GNSS satellite matching the satellite identifier in the received GNSS signal; and comparing, in response to determining the inference event, a second derived satellite parameter of the received GNSS signal with a corresponding second expected satellite parameter from the satellite tracking table for the matching satellite to confirm the interference event.

16. The non-transitory computer-readable medium of claim 15, wherein the method further comprising:

determining, in response to determining the interference event, a location of a source of the GNSS signal.

17. The non-transitory computer-readable medium of claim 15, wherein the method further comprising:

displaying the determined location.

18. The non-transitory computer-readable medium of claim 15, wherein the method further comprising:

merging the interference event determined at the first AP with another interference event determined at a second AP, the second AP located in a neighborhood of the first AP.

19. The non-transitory computer-readable medium of claim 15, wherein the satellite tracking table is created at a Wireless Local Area Network (LAN) Controller (WLC).

20. The non-transitory computer-readable medium of claim 15, wherein the corresponding expected satellite parameter further comprises one or more of the following:

a constellation type;

a time window of active use;

a signal-to-noise ratio associated with the received GNSS signal;

a carrier-to-noise ratio associated with the received GNSS signal;

a satellite pseudorange;

a rate of change of the satellite pseudorange;

a rate of change of the signal-to-noise ratio;

a rate of change of the carrier-to-noise ratio;

a power associated with the received GNSS signal; and an in-band power density of the received GNSS signal.

* * * * *